(12) United States Patent
Xue et al.

(10) Patent No.: US 10,652,138 B2
(45) Date of Patent: May 12, 2020

(54) LINK DECISION-MAKING METHOD AND DECISION-MAKING DEVICE

(71) Applicant: Tencent Technology (Shenzhen) Company Limited, Shenzhen (CN)

(72) Inventors: Zheng Xue, Shenzhen (CN); Yu Zhou, Shenzhen (CN); Jing Lv, Shenzhen (CN); Yanbai Zhao, Shenzhen (CN); Baojian Wang, Shenzhen (CN); Ningbo Qiao, Shenzhen (CN)

(73) Assignee: Tencent Technology (Shenzhen) Company Limited, Shenzhen, Guangdong Province (CN)

( * ) Notice: Subject to any disclaimer, the term of this patent is extended or adjusted under 35 U.S.C. 154(b) by 61 days.

(21) Appl. No.: 16/024,181

(22) Filed: Jun. 29, 2018

(65) Prior Publication Data

US 2018/0309644 A1    Oct. 25, 2018

Related U.S. Application Data

(63) Continuation-in-part of application No. PCT/CN2017/078573, filed on Mar. 29, 2017.

(30) Foreign Application Priority Data

Apr. 12, 2016 (CN) .......................... 2016 1 0225404

(51) Int. Cl.
*H04L 12/24* (2006.01)
*H04L 12/26* (2006.01)
*H04L 12/707* (2013.01)

(52) U.S. Cl.
CPC .......... *H04L 45/22* (2013.01); *H04L 41/5025* (2013.01); *H04L 41/5087* (2013.01);
(Continued)

(58) Field of Classification Search
CPC ... H04L 29/00–04; H04L 41/00; H04L 41/08; H04L 41/0803; H04L 41/0816;
(Continued)

(56) References Cited

U.S. PATENT DOCUMENTS

| | | | |
|---|---|---|---|
| 6,178,448 B1 * | 1/2001 | Gray | H04L 45/00 370/468 |
| 7,995,464 B1 * | 8/2011 | Croak | H04L 41/5009 370/218 |

(Continued)

FOREIGN PATENT DOCUMENTS

| | | |
|---|---|---|
| CN | 102594703 A | 7/2012 |
| CN | 103718532 A | 4/2014 |

(Continued)

OTHER PUBLICATIONS

Tencent Technology, ISRWO, PCT/CN2017/078573, May 31, 2017, 7 pgs.

(Continued)

*Primary Examiner* — Tauqir Hussain
*Assistant Examiner* — Boris D Grijalva Lobos
(74) *Attorney, Agent, or Firm* — Morgan, Lewis & Bockius LLP

(57) ABSTRACT

This application discloses a link decision-making method, applied to a link decision-making system including first and second user equipment that are in a Voice over Internet Protocol (VoIP) call status, a transit server, and a decision-making computing device. A first link directly connecting the two user equipment and a second link that transits by using the transit server exist between the two user equipment. The decision-making computing device is responsible for making, according to a link quality score of a current sending link between the first and second user equipment, a decision about using the first link or the second link as a (Continued)

subsequent sending link of the first user equipment. According to the link decision-making method provided in this application, it can be ensured that a better link can be selected to transmit a data stream of VoIP, thereby improving the quality of service (QoS) of the VoIP.

14 Claims, 4 Drawing Sheets

(52) U.S. Cl.
CPC .............. *H04L 43/08* (2013.01); *H04L 43/16* (2013.01); *H04L 45/24* (2013.01)

(58) Field of Classification Search
CPC . H04L 41/50; H04L 41/5019; H04L 41/5025; H04L 41/508; H04L 41/5087; H04L 43/00; H04L 43/08; H04L 43/16; H04L 45/00; H04L 45/14; H04L 45/22; H04L 45/24; H04L 47/00–122; H04L 67/00; H04L 67/28; H04L 67/2814; H04L 67/32; H04L 67/322; H04L 67/327; H04L 41/0813
See application file for complete search history.

(56) References Cited

U.S. PATENT DOCUMENTS

| | | | | |
|---|---|---|---|---|
| 8,089,939 B1* | 1/2012 | Mater | .................. | H04W 36/30 370/332 |
| 8,472,342 B1* | 6/2013 | Bucko | ................ | H04L 12/5691 370/238 |
| 9,832,799 B2* | 11/2017 | Morita | .................. | H04W 76/14 |
| 9,980,304 B2* | 5/2018 | Huang | .................. | H04W 12/06 |
| 10,038,734 B2* | 7/2018 | Heatley | .................. | G06F 11/10 |
| 2007/0161351 A1* | 7/2007 | Lee | ....................... | H04L 1/0026 455/69 |
| 2007/0291655 A1* | 12/2007 | Moore | .............. | H04L 29/06027 370/252 |
| 2009/0185492 A1* | 7/2009 | Senarath | ................ | H04B 7/155 370/238 |
| 2010/0261469 A1* | 10/2010 | Ribeiro | ................. | H04W 99/00 455/423 |
| 2013/0039201 A1* | 2/2013 | Kwon | .................... | H04L 45/22 370/252 |
| 2013/0070755 A1* | 3/2013 | Trabelsi | .............. | H04L 65/1043 370/352 |
| 2013/0235731 A1 | 9/2013 | Hadinata et al. | | |
| 2014/0004793 A1* | 1/2014 | Bandyopadhyay | ......................... | H04L 63/0428 455/41.1 |
| 2014/0211705 A1* | 7/2014 | Baek | .................... | H04W 76/023 370/329 |
| 2014/0213221 A1* | 7/2014 | Chai | ................. | H04W 72/0493 455/411 |
| 2015/0009915 A1* | 1/2015 | Baek | ..................... | H04W 36/00 370/329 |
| 2015/0094064 A1* | 4/2015 | Lei | ........................ | H04W 36/03 455/436 |
| 2015/0099511 A1* | 4/2015 | Lindoff | ................. | H04W 24/08 455/426.1 |
| 2015/0133112 A1* | 5/2015 | Wang | .................... | H04W 76/14 455/426.1 |
| 2015/0163842 A1* | 6/2015 | Kalhan | ................. | H04W 8/005 455/500 |
| 2015/0334755 A1* | 11/2015 | Ayadurai | .............. | H04W 76/14 370/252 |
| 2016/0198518 A1* | 7/2016 | Baek | ..................... | H04W 24/10 370/329 |
| 2016/0286571 A1* | 9/2016 | Gattami | ................ | H04W 76/14 |
| 2016/0295627 A1* | 10/2016 | Karout | ................. | H04B 17/309 |
| 2016/0337954 A1* | 11/2016 | Gulati | .................... | H04W 76/14 |
| 2017/0188410 A1* | 6/2017 | Yaver | .................... | H04W 28/08 |
| 2017/0251507 A1* | 8/2017 | Fodor | ................... | H04W 76/14 |

FOREIGN PATENT DOCUMENTS

| | | |
|---|---|---|
| CN | 104160687 A | 11/2014 |
| CN | 105897478 A | 8/2016 |

OTHER PUBLICATIONS

Tencent Technology, IPRP, PCT/CN2017/078573, Oct. 16, 2018, 6 pgs.

* cited by examiner

LINK DECISION-MAKING METHOD AND DECISION-MAKING DEVICE

CROSS-REFERENCE TO RELATED APPLICATION

This application is a continuation-in-part application of PCT/CN2017/078573, entitled "LINK DECISION-MAKING METHOD AND DECISION-MAKING DEVICE" filed on Mar. 29, 2017, which claims priority to Chinese Patent Application No. 201610225404.X, entitled "LINK DECISION-MAKING METHOD AND DECISION-MAKING DEVICE" filed on Apr. 12, 2016, all of which are incorporated herein by reference in their entirety

FIELD OF THE TECHNOLOGY

This application relates to the field of communications technologies, and more particularly, to a link decision-making method and a decision-making computing device.

BACKGROUND OF THE DISCLOSURE

Voice over Internet Protocol (VoIP) has two transmission manners: direct connection and transit.

The direct connection is that a user equipment performs point to point (P2P) data transmission with another user equipment. The advantage of the direct connection is simplicity and high efficiency, and the disadvantage of the direct connection is weak stability and controllability. The transit is to add a transit server between two user equipment that are in a call, and a data stream needs to be transmitted to a peer end by using the transit server. The advantage of the transit is stability and controllability, and the disadvantage of the transit is a need for support by a server resource and a bandwidth resource.

In view of the above, the two transmission manners: direct connection and transit both have respective advantages and disadvantages. Directly using either transmission manner cannot ensure that the link quality of the VoIP is always stable and reliable.

SUMMARY

An embodiment of this application provides a link decision-making method, so that the link quality can be assessed according to the quality of service (QoS) of audio data, and then a link on which VoIP is performed and that can ensure the QoS of a VoIP call is determined. An embodiment of this application further provides a corresponding decision-making computing device.

A first aspect of this application provides a link decision-making method, the method being applied to a link decision-making system, the link decision-making system including a first user equipment and a second user equipment that are in a Voice over Internet Protocol (VoIP) call status, a transit server, and a decision-making computing device, a first link directly connecting the first user equipment to the second user equipment and a second link that transits by using the transit server existing between the first user equipment and the second user equipment, and the method including:

receiving, by the decision-making computing device, audio service quality data reported by the first user equipment, the audio service quality data being determined by the second user equipment according to audio data sent by the first user equipment and being returned to the first user equipment;

determining, by the decision-making computing device according to the audio service quality data, a link quality score of a current sending link of the first user equipment, the current sending link being the first link or the second link; and making, by the decision-making computing device according to the link quality score of the current sending link, a decision about using the first link or the second link as a subsequent sending link of the first user equipment.

A second aspect of this application provides a decision-making computing device having one or more processors and memory storing a plurality of programs, the decision-making computing device being applied to a link decision-making system, the link decision-making system further comprising a first user equipment and a second user equipment that are in a Voice over Internet Protocol (VoIP) call status and a transit server, a first link directly connecting the first user equipment to the second user equipment and a second link that transits by using the transit server existing between the first user equipment and the second user equipment, wherein the plurality of programs, when executed by the one or more processors, cause the decision-making computing device to perform the aforementioned link decision-making method.

A third aspect of this application provides a non-transitory computer readable storage medium storing a plurality of programs in connection with a decision-making computing device having one or more processors, the decision-making computing device being applied to a link decision-making system, the link decision-making system further comprising a first user equipment and a second user equipment that are in a Voice over Internet Protocol (VoIP) call status and a transit server, a first link directly connecting the first user equipment to the second user equipment and a second link that transits by using the transit server existing between the first user equipment and the second user equipment, wherein the plurality of programs, when executed by the one or more processors, cause the decision-making computing device to perform the aforementioned link decision-making method.

Compared with that in the existing technology, a VoIP call is made by using either a link for direct connection or a link for transit, the two links having respective disadvantages, according to the link decision-making method provided in this application, a decision about selecting the first link or the second link as the subsequent sending link may be made according to the link quality of the current sending link of the first user equipment, so as to ensure that a better link for transmitting a data stream of the VoIP is selected, thereby improving the QoS of the VoIP.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person skilled in the art may still derive other drawings from these accompanying drawings without creative efforts.

DESCRIPTION OF EMBODIMENTS

An embodiment of this application provides a link decision-making method, so that the link quality can be assessed according to the QoS of audio data, and then a link on which VoIP is performed and that can ensure the QoS of a VoIP call is determined. An embodiment of this application further provides a corresponding decision-making computing device. Detailed descriptions are separately provided below.

The following clearly and completely describes the technical solutions in the embodiments of this application with reference to the accompanying drawings in the embodiments of this application. Apparently, the described embodiments are some embodiments of this application rather than all of the embodiments. All other embodiments obtained by a person skilled in the art based on the embodiments of this application without creative efforts shall fall within the protection scope of this application.

VoIP is to digitalize an analog signal (voice) for real-time transmission on an IP network in a form of a data packet, for example, voice services of interconnected network calls and instant messaging.

The VoIP has two transmission manners: direct connection and transit. The direct connection is that a user equipment performs P2P data transmission with another user equipment. The transit is to add a transit server between two user equipment that are in a call, and a data stream needs to be transmitted to a peer end by using the transit server. A link for direct connection and a link for transit both have respective advantages and disadvantages. Therefore, to better ensure the QoS of an audio stream in a transmission process, this application provides a solution of making, according to the audio QoS of a current sending link, a decision about subsequently selecting a link for direct connection or a link for transit as a subsequent sending link, so as to ensure that a better link for transmitting a data stream of the VoIP is selected, thereby improving the QoS of the VoIP.

In this application, "first" and "second" in a first user equipment and a second user equipment have no specific reference, and refer to two user equipment that in a VoIP call with each other. The two user equipment both have the capability of reporting audio service quality data in this application. A link decision-making process in this application is introduced below with reference to FIG. 1.

Figure 1:
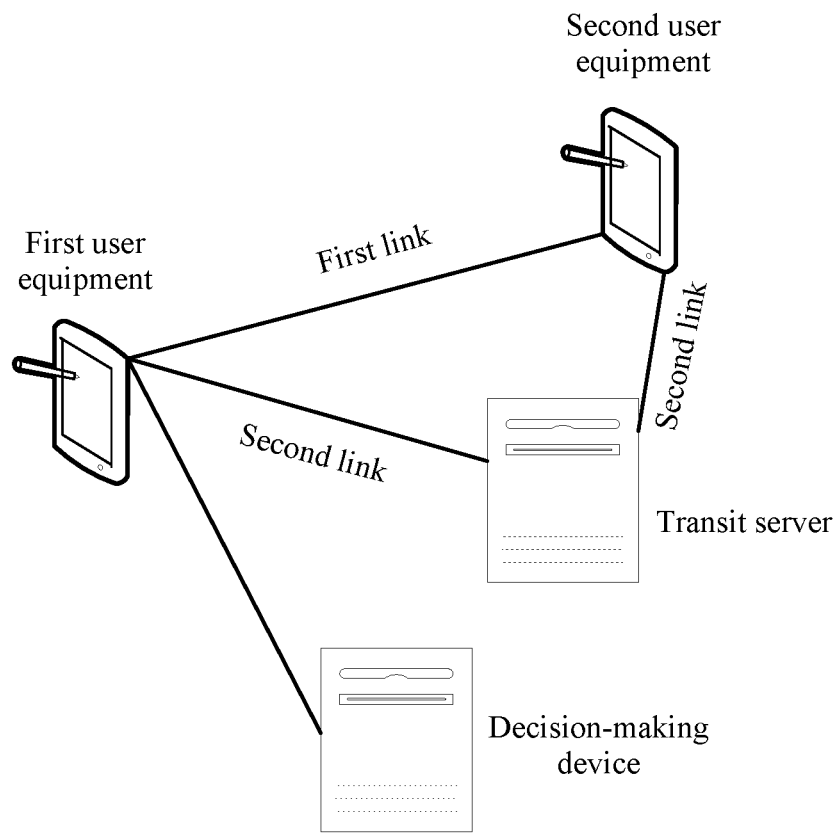
FIG. 1 is a schematic diagram of an embodiment of a link decision-making system according to an embodiment of this application.

FIG. 1 is a schematic diagram of an embodiment of a link decision-making system according to an embodiment of this application.

As shown in FIG. 1, the link decision-making system in this embodiment of this application includes a first user equipment and a second user equipment that are in a VoIP call status, a transit server, and a decision-making computing device. A first link directly connecting the first user equipment to the second user equipment and a second link that transits by using the transit server exist between the first user equipment and the second user equipment. When the first user equipment and the second user equipment are in the VoIP call status, no matter whether the first user equipment sends audio data to the second user equipment by using the first link or the second link, the second user equipment determines, according to the received audio data, audio service quality data of a current sending link used by the first user equipment, and then the second user equipment feeds back the determined audio service quality data to the first user equipment.

The second user equipment sends the audio service quality data to the first user equipment by using a decision-making information data packet. The decision-making information data packet is usually a Real-time Transport Control Protocol (RTCP) packet.

Figure 2:
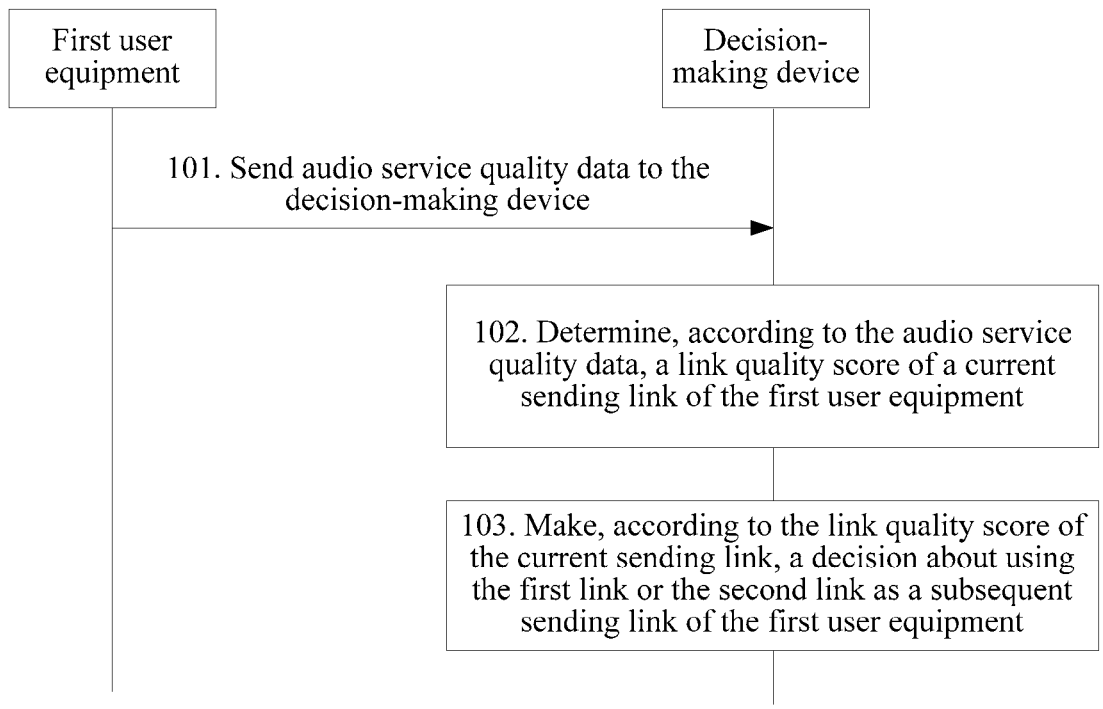
FIG. 2 is a schematic diagram of an embodiment of a link decision-making method according to an embodiment of this application.

Reference may be made to FIG. 2 for understanding of the link decision-making decision involved after the first user equipment receives the decision-making information data packet.

FIG. 2 is a schematic diagram of an embodiment of a link decision-making method according to an embodiment of this application.

101: A first user equipment sends audio service quality data to a decision-making computing device, the audio service quality data being determined by a second user equipment according to audio data sent by the first user equipment and being returned to the first user equipment.

After receiving a decision-making information data packet, the first user equipment samples data in the decision-making information data packet. The amount of data sampled by the first user equipment may be pre-notified by a decision-making server. For example, data is collected at 15 sampling points. Audio service quality parameters collected at the sampling points are the same. The audio service quality parameter collected at each sampling point may include but is not limited to: a network packet loss $e_{network}$, a playout packet loss $e_{playout}$, a coding delay $d_{codec}$ a playout delay $d_{playout}$, and a network delay $d_{network}$.

The audio service quality data sent by the first user equipment to the decision-making computing device may be the audio service quality parameter corresponding to each sampling point. For example, as stated above, data is collected at 15 sampling points, and then the audio service quality data reported to the decision-making computing device is the network packet loss $e_{network}$, the playout packet loss $e_{playout}$, the coding $d_{codec}$, the playout delay $d_{playout}$, and the network delay $d_{network}$ corresponding to each of the 15 sampling points.

102: The decision-making computing device determines, according to the audio service quality data, a link quality score of a current sending link of the first user equipment, the current sending link being a first link or a second link.

Optionally, step 102 may include:

sanitizing, by the decision-making computing device, the audio service quality data, and determining audio service quality data of an effective sample in the audio service quality data; and determining, by the decision-making computing device according to an audio service quality parameter of the effective sampling point and a correspondence between the link quality score and the audio service quality parameter, the link quality score of the current sending link of the first user equipment.

After receiving the audio service quality parameter, sent by the first user equipment, of each sampling point, given that some sampling points may be repetitive or audio service quality parameters of some sampling points excessively deviate due to a network jitter, the decision-making computing device needs to clean audio service quality parameters of these abnormal sampling points, and audio service quality parameters of the remaining sampling points after sanitizing are service quality parameters of effective sampling points.

The audio service quality parameter of each sampling point includes the network packet loss $e_{network}$, the playout packet loss $e_{playout}$, the coding delay $d_{codec}$, the playout delay $d_{playout}$, and the network delay $d_{network}$. The decision-making computing device may calculate average values of network packet losses $e_{network}$, playout packet losses $e_{playout}$, coding delays $d_{codec}$, playout delays $d_{playout}$, and network delays $d_{network}$ of all the effective sampling points by using the parameters. Then the decision-making computing device determines the link quality score of the current sending link of the first user equipment according to the following formula of a correspondence between the link quality score and the audio service quality parameter:

$$F=94.2-(\gamma_1+\gamma_2 \ln(1+\gamma_3 e))-(0.02d+0.11(d-177.3)H(d-177.3)$$

Where $d=d_{codec}+d_{playout}+d_{network}$, and $e=e_{network}+(1-e_{network})e_{playout}$. In addition, $d_{codec}$, $d_{playout}$, $d_{network}$, $e_{network}$, and $e_{playout}$ involved in the formula are all average values of the effective sampling points. In addition, $(\gamma_1, \gamma_2\gamma_3)$ is a group of parameters related to an encoder, and, and $H(x)$ is defined as: $(x<0)?0:1$. That is, when $d-177.3$ is greater than 0, $H(d-177.3)$ is 1, and when $d-177.3$ is less than 0, $H(d-177.3)$ is 0.

A result F of calculation is the link quality score of the current sending link.

103: The decision-making computing device makes, according to the link quality score of the current sending link, a decision about using the first link or the second link as a subsequent sending link of the first user equipment.

Optionally, step 103 includes:

determining, by the decision-making computing device, a decision-making model according to stored historical link information; and determining, by the decision-making computing device according to the link quality score of the current sending link and the decision-making model, the first link or the second link as the subsequent sending link of the first user equipment.

Given that frequent link handovers may make audio signals unstable, in a link decision-making process, not only the link quality score of the current sending link is used a basis, but also stored historical link information needs to be considered.

In this application, the historical link information is stored in a queue. A maximum length L is set for the queue, and old information is deleted from the queue if the maximum length is exceeded. In this way, not only the need for searching for the historical link information is met, but also it can be ensured that the queue is not excessively long, so that stored resources are not wasted.

Figure 3A:
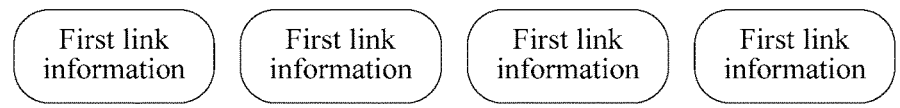
FIG. 3A is a schematic diagram of a queue of historical link information according to this embodiment of this application.
Figure 3B:
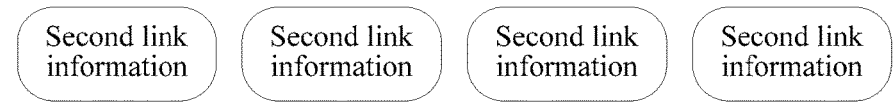
FIG. 3B is a schematic diagram of a queue of historical link information according to this embodiment of this application.
Figure 4:
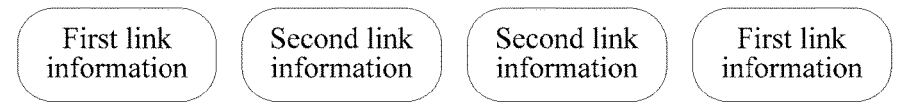
FIG. 4 is a schematic diagram of a queue of historical link information according to this embodiment of this application.

The decision-making model in this application is determined according to the type of a historical link stored in the queue. There are two manners of storing historical link information in the queue. One manner is to include only one type of historical link information, as shown in FIGS. 3A and 3B. FIG. 3A shows that only first link information is included, and FIG. 3B shows that only second link information is included. The other manner is to include two types of link information, as shown in FIG. 4, not only include the first link information, but also include the second link information.

Optionally, for cases shown in FIG. 3A and FIG. 3B, the determining, by the decision-making computing device, a decision-making model according to stored historical link information may include:

when the historical link information includes only information about one type of link, determining the decision-making model as an absolute threshold decision-making model, where the one type of link is the first link or the second link, and a formula of the absolute threshold decision-making model is as follows:

$$Threshold_{abs}=Threshold_{abs0}-X^n$$

where $Threshold_{abs}$ is a current absolute threshold, $Threshold_{abs0}$ is an initial absolute threshold, X is an attenuation parameter, and n is a total number of times of link handover up to now; and the determining, by the decision-making computing device according to the link quality score of the current sending link and the decision-making model, the first link or the second link as the subsequent sending link of the first user equipment may include:

when determining that the link quality score of the current sending link is less than the current absolute threshold $Threshold_{abs}$, making, by the decision-making computing device, a decision about using another link as the subsequent sending link of the first user equipment, where the another link is the second link or the first link.

Optionally, for the case shown in FIG. 4, the determining, by the decision-making computing device, a decision-making model according to stored historical link information may include:

when the historical link information includes information about two types of links, determining the decision-making model as a relative threshold decision-making model, where a formula of the relative threshold decision-making model is as follows:

$$Threshold_{rel}=Threshold_{rel0}-X^n$$

where $Threshold_{rel}$ is a current relative threshold, $Threshold_{rel0}$ is an initial relative threshold, X is an attenuation parameter, and n is a total number of times of link handover up to now; and the determining, by the decision-making computing device according to the link quality score of the current sending link and the decision-making model, the first link or the second link as the subsequent sending link of the first user equipment includes:

when determining that a difference between the link quality score of the current sending link and a quality score of another link is less than the current relative threshold $Threshold_{rel}$, making, by the decision-making computing device, a decision about using the another link as the subsequent sending link of the first user equipment, where if the current sending link is the first link, the another link is the second link, and if the current sending link is the second link, the another link is the first link.

Exponential attenuation is performed on a handover threshold, so that the handover frequency and the number of times of handover can be effectively controlled to protect the stability of a VoIP session link.

In addition, optionally, the decision-making computing device sends a link handover instruction to the first user equipment, where the link handover instruction is used to instruct:

the first user equipment to hand over from the first link to the second link if the current sending link is the first link, and the subsequent sending link is the second link; and the first user equipment to hand over from the second link to the first link if the current sending link is the second link, and the subsequent sending link is the first link.

In a link handover decision-making logic of this application, for cases of handing over from transit to direct connection and handing over from direct connection to transit, the bias for link selection may be controlled by setting different initial thresholds and attenuation parameters, so that the system can weight selection in overall link performance and overall bandwidth overhead of the server. If a link for direct connection needs to be used as frequently as possible, the setting of the initial thresholds and the attenuation parameters may be biased to the link for direct connection. If a link for transit needs to be used as frequently as possible, the setting of the initial thresholds and the attenuation parameters may be biased to the link for transit. The initial thresholds and the attenuation parameters are set by a developer in an initial status.

Optionally, to alleviate request processing load of the decision-making computing device, this application further includes:

when the subsequent sending link is the same as the current sending link, and time when the current sending link is used exceeds n decision-making periods, determining, by the decision-making computing device according to the following formula, a time interval to a next request for link decision-making, where n is an integer greater than 1;

$$Period = Period_0 + n*\Delta$$

where $Period_0$ is an initial time interval, n is a decision-making period, and $\Delta$ is a link stability coefficient; and sending, by the decision-making computing device, the time interval Period to the first user equipment.

A larger n indicates a more stable current sending link, that is, a lower handover need in a short term. Then, it is practical to appropriately increase a time interval to a next double-link request. This dynamic request design can greatly reduce the overall load of the decision-making computing device with little impact on time and efficiency of handover.

Information about using the first link or the second link as the subsequent sending link of the first user equipment is delivered, and a time interval to link assessment next time is delivered to the first user equipment.

Compared with that in the existing technology, a VoIP call is made by using either a link for direct connection or a link for transit, the two links having respective disadvantages, according to the link decision-making method provided in this application, a decision about selecting the first link or the second link as the subsequent sending link may be made according to the link quality of the current sending link of the first user equipment, so as to ensure that a better link for transmitting a data stream of the VoIP is selected, thereby improving the QoS of the VoIP.

The foregoing is described from the perspective of interaction between the first user equipment and the decision-making computing device. The following subdivides functions in the decision-making computing device and the decision-making computing device may include several modules shown in FIG. 5.

Figure 5:
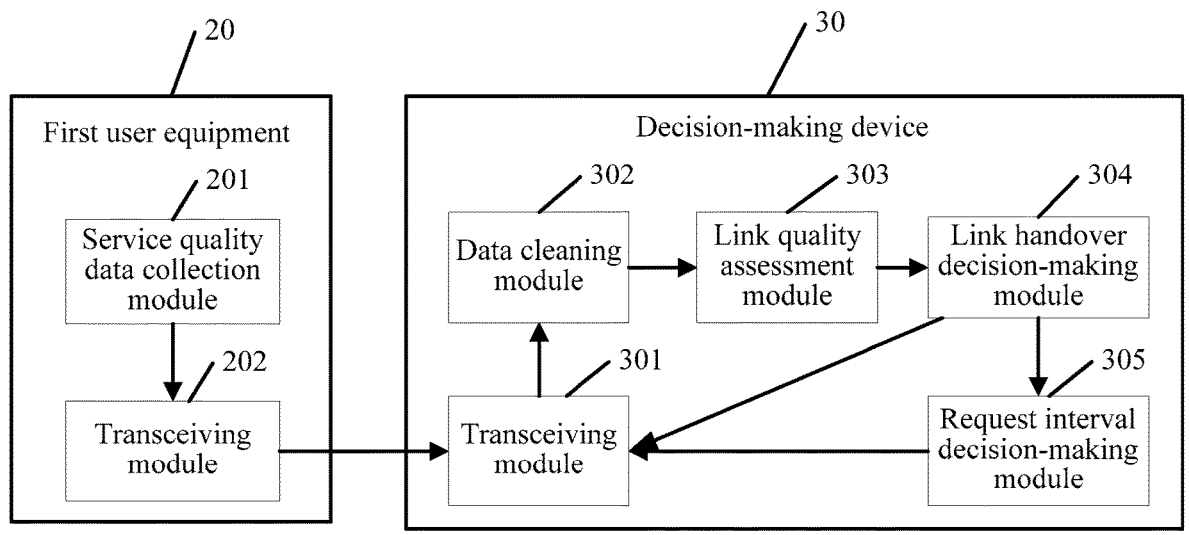
FIG. 5 is a schematic diagram of a link decision-making process of a decision-making computing device in a decision-making system according to an embodiment of this application.

FIG. 5 is a schematic diagram of a link decision-making process of a decision-making computing device in a decision-making system according to an embodiment of this application.

The link decision-making system shown in FIG. 5 includes a first user equipment 20 and a decision-making computing device 30. The first user equipment includes a service quality data collection module 201 and a transceiving module 202. The decision-making computing device includes a transceiving module 301, a data sanitizing module 302, a link quality assessment module 303, a link handover decision-making module 304, and a request interval decision-making module 305.

The data collection module 201 collects, from an RTCP packet returned by a second user equipment, audio service quality parameters of sampling points, and then the transceiving module 202 reports the audio service quality parameters to the decision-making computing device.

After the transceiving module 301 receives the audio service quality parameters of the sampling points, the data sanitizing module 302 sanitizes the audio service quality parameters of the sampling points, to clean audio service quality parameters of repetitive and abnormal sampling points, and filter audio service quality parameters of effective sampling points.

The link quality assessment module 303 determines a link quality score F of the current sending link of the first user equipment according to the correspondence between the link quality score and the audio service quality parameter and described in step 102.

The link handover decision-making module 304 makes a decision according to two models in optional steps in step 103, to determine whether to perform link handover.

The request interval decision-making module 305 makes a decision about a time interval to a next request for link decision-making according to $$Period = Period_0 + n*\Delta.$$

When sending a link decision to the first user equipment, the transceiving module 301 delivers the time interval Period to the next request for link decision-making.

Reference may be made to the process described in a part of FIG. 2 for understanding of the specific process of implementing functions of the modules shown in FIG. 5.

Figure 6:
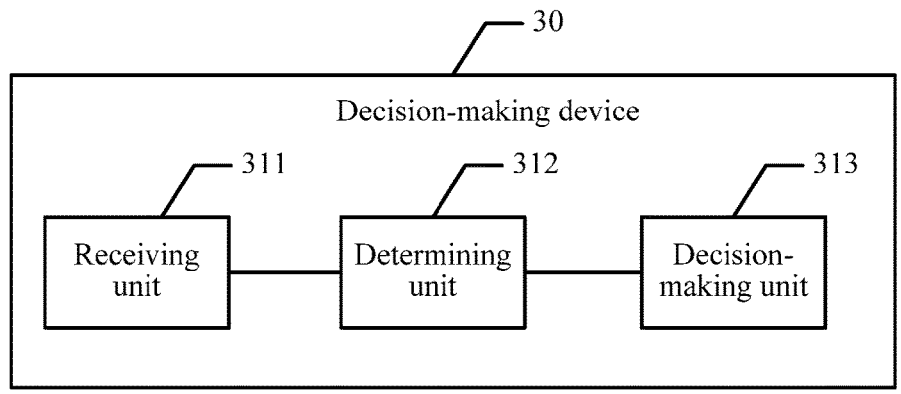
FIG. 6 is a schematic diagram of an embodiment of the decision-making computing device according to this embodiment of this application.

Referring to FIG. 6, an embodiment of the decision-making computing device 30 according to this embodiment of this application includes: the decision-making computing device 30 being applied to the link decision-making system, the link decision-making system further including a first user equipment and a second user equipment that are in a VoIP call status and a transit server, a first link directly connecting the first user equipment to the second user equipment and a second link that transits by using the transit server existing between the first user equipment and the second user equipment, and the decision-making computing device including:

a receiving unit, 311 configured to receive audio service quality data reported by the first user equipment, the audio service quality data being determined by the second user equipment according to audio data sent by the first user equipment and being returned to the first user equipment;

a determining unit 312, configured to determine, according to the audio service quality data received by the receiving unit 311, a link quality score of a current sending link of the first user equipment, the current sending link being the first link or the second link; and a decision-making unit 313, configured to make, according to the link quality score, determined by the determining unit 312, of the current sending link, a decision about using the first link or the second link as a subsequent sending link of the first user equipment.

Compared with that in the existing technology, a VoIP call is made by using either a link for direct connection or a link for transit, the two links having respective disadvantages, the decision-making computing device provided in this application may make, according to the link quality of the current sending link of the first user equipment, a decision about selecting the first link or the second link as the subsequent sending link, so as to ensure that a better link for transmitting a data stream of the VoIP is selected, thereby improving the QoS of the VoIP.

Optionally, the determining unit 312 is configured to:

clean the audio service quality data, and determine audio service quality data of an effective sample in the audio service quality data; and determine, according to an audio service quality parameter of the effective sampling point and a correspondence between the link quality score and the audio service quality parameter, the link quality score of the current sending link of the first user equipment.

Figure 7:
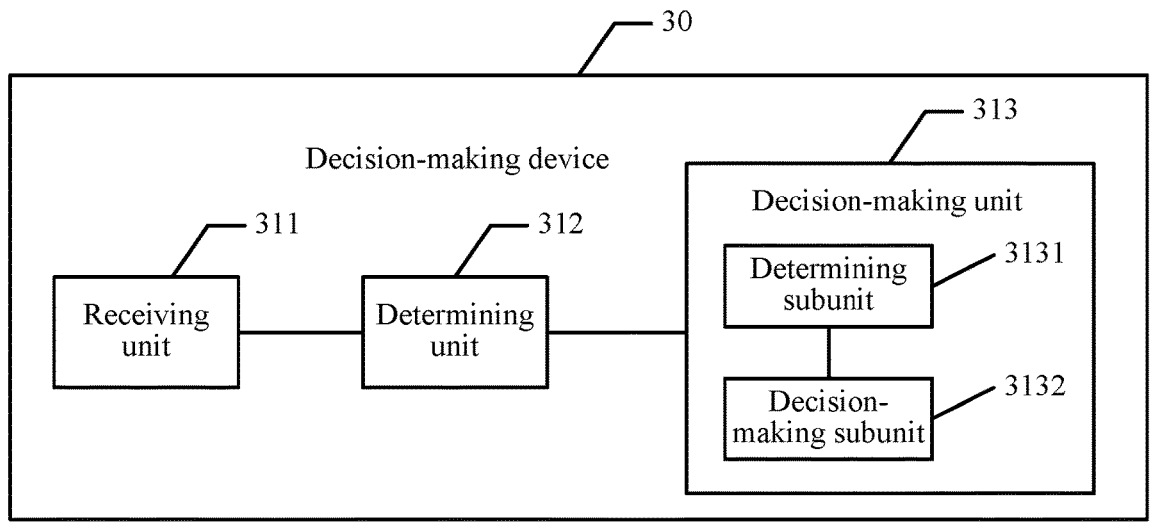
FIG. 7 is a schematic diagram of another embodiment of the decision-making computing device according to this embodiment of this application.

Optionally, referring to FIG. 7, in another embodiment of the decision-making computing device according to this embodiment of this application, the decision-making unit 313 includes:

a determining subunit 3131, configured to determine a decision-making model according to stored historical link information; and a decision-making subunit 3132, configured to determine, according to the link quality score of the current sending link and the decision-making model that is determined by the determining subunit 3131, the first link or the second link as the subsequent sending link of the first user equipment.

Optionally, the determining subunit 3131 is configured to: when the historical link information includes only information about one type of link, determine the decision-making model as an absolute threshold decision-making model, where the one type of link is the first link or the second link, and a formula of the absolute threshold decision-making model is as follows:

$$Threshold_{abs} = Threshold_{abs0} - X^n$$

where $Threshold_{abs}$ is a current absolute threshold, $Threshold_{abs0}$ is an initial, absolute threshold, X is an attenuation parameter, and n is a total number of times of link handover up to now; and the decision-making subunit 3132 is configured to: when determining that the link quality score of the current sending link is less than the current absolute threshold $Threshold_{abs}$, make a decision about using another link as the subsequent sending link of the first user equipment, where the another link is the second link or the first link.

Optionally, the determining subunit 3131 is configured to: when the historical link information includes information about two types of links, determine the decision-making model as a relative threshold decision-making model, where a formula of the relative threshold decision-making model is as follows:

$$Threshold_{rel} = Threshold_{rel0} - X^n$$

where $Threshold_{rel}$ is a current relative threshold, $Threshold_{rel0}$ is an initial relative threshold, X is an attenuation parameter, and n is a total number of times of link handover up to now; and the decision-making subunit 3132 is configured to: when determining that a difference between the link quality score of the current sending link and a quality score of another link is less than the current relative threshold $Threshold_{rel}$, make a decision about using the another link as the subsequent sending link of the first user equipment, where if the current sending link is the first link, the another link is the second link, and if the current sending link is the second link, the another link is the first link.

Figure 8:
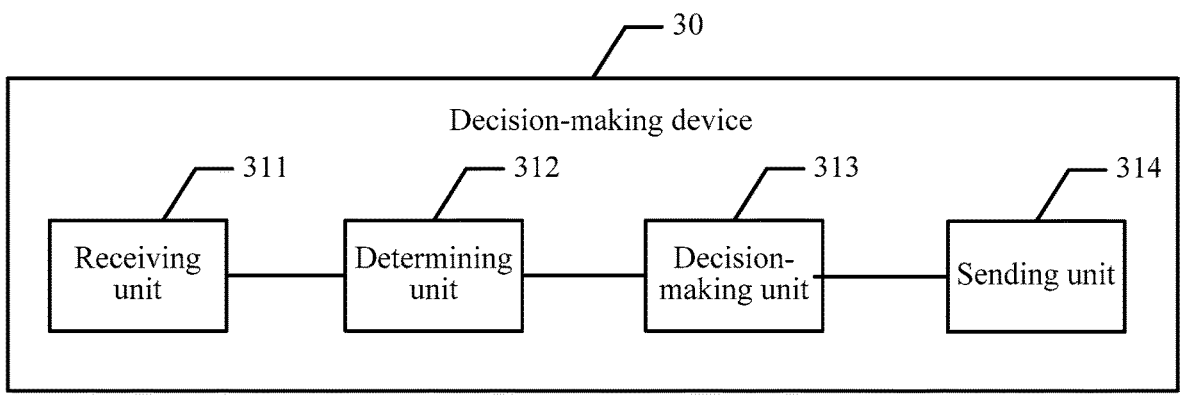
FIG. 8 is a schematic diagram of still another embodiment of the decision-making computing device according to this embodiment of this application.

Optionally, referring to FIG. 8, in still another embodiment of the decision-making computing device according to this embodiment of this application, the decision-making computing device further includes:

a sending unit 314, configured to send a link handover instruction to the first user equipment, where the link handover instruction is used to instruct:

the first user equipment to hand over from the first link to the second link if the current sending link is the first link, and the subsequent sending link is the second link; and the first user equipment to hand over from the second link to the first link if the current sending link is the second link, and the subsequent sending link is the first link.

Optionally, in the still another embodiment of the decision-making computing device according to this embodiment of this application, the determining unit 312 is further configured to: when the subsequent sending link is the same as the current sending link, and time when the current sending link is used exceeds n decision-making periods, determine, according to the following formula, a time interval to a next request for link decision-making, where n is an integer greater than 1;

$$Period = Period_0 + n*\Delta$$

where $Period_0$ an initial time interval, n is a decision-making period, and $\Delta$ is a link stability coefficient; and the sending unit 314 is further configured to send the time interval Period determined by the determining unit to the first user equipment.

Figure 9:
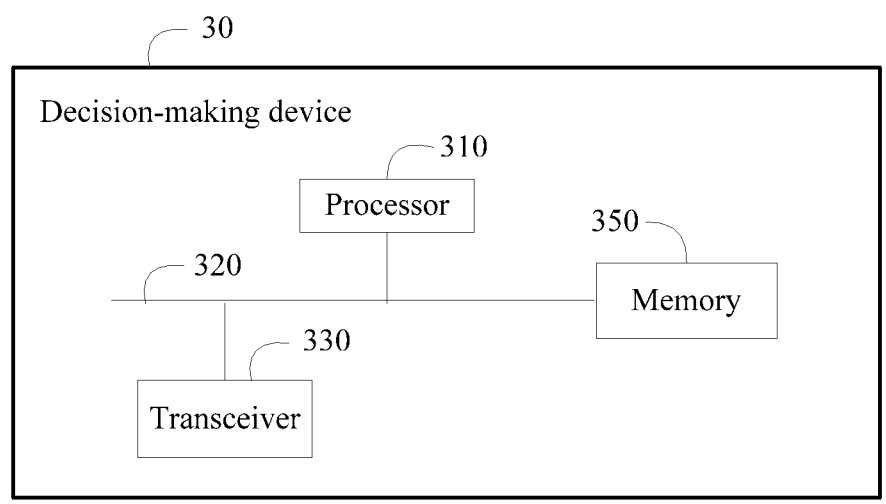
FIG. 9 is a schematic diagram of another embodiment of a decision-making computing device according to an embodiment of this application.

FIG. 9 is a schematic structural diagram of a decision-making computing device 30 according to an embodiment of this application. The decision-making computing device 30 is applied to a link decision-making system. The link decision-making system further includes a first user equipment and a second user equipment that are in a VoIP call status and a transit server. A first link directly connecting the first user equipment to the second user equipment and a second link that transits by using the transit server exist between the first user equipment and the second user equipment. The decision-making computing device 30 includes a processor 310, a memory 350, and a transceiver 330. The memory 350 may include a read-only memory (ROM) and a random access memory (RAM), and provides operating instructions and data to the processor 310. A part of the memory 350 may further include a non-volatile RAM (NVRAM).

In some implementations, the memory 350 stores the following elements: an executable module, a data structure, a subset thereof, or an extension set thereof.

In this embodiment of this application, by calling operating instructions (the operating instructions may be stored in an operating system) stored in the memory 350, the transceiver 330 receives audio service quality data reported by the first user equipment, the audio service quality data being determined by the second user equipment according to audio data sent by the first user equipment and being returned to the first user equipment;

a link quality score of a current sending link of the first user equipment is determined according to the audio service quality data, the current sending link being the first link or the second link; and a decision about using the first link or the second link as a subsequent sending link of the first user equipment is made according to the link quality score of the current sending link.

Compared with that in the existing technology, a VoIP call is made by using either a link for direct connection or a link for transit, the two links having respective disadvantages, the decision-making computing device provided in this application may make, according to the link quality of the current sending link of the first user equipment, a decision about selecting the first link or the second link as the subsequent sending link, so as to ensure that a better link for transmitting a data stream of the VoIP is selected, thereby improving the QoS of the VoIP.

The processor 310 controls operation of the decision-making computing device 30. The processor 310 may also be referred to as a central processing unit (CPU). The memory 350 may include a ROM and a RAM, and provides instructions and data to the processor 310. A part of the memory 350 may further include an NVRAM. During specific application, all components of the decision-making computing device 30 are coupled together by using a bus system 320, and in addition to a data bus, the bus system 320 may further include a power source bus, a control bus, a status signal bus, and the like. However, for ease of clear description, all types of buses in the figure are marked as the bus system 320.

The foregoing methods disclosed in the embodiments of this application may be applied to the processor 310, or may be implemented by the processor 310. The processor 310 may be an integrated circuit chip, having a capability of processing a signal. In an implementation process, steps of the foregoing methods may be completed by using an integrated logical circuit of hardware in the processor 310 or an instruction in a form of software. The processor 310 may be a general processing unit, a digital signal processor (DSP), an application-specific integrated circuit (ASIC), a field programmable gate array (FPGA), or another programmable logic device, discrete gate or transistor logic device, or discrete hardware assembly. The methods, steps, and logical block diagrams disclosed in the embodiments of this application may be implemented or performed. The general processing unit may be a microprocessor, any regular processor, or the like. In combination with the methods disclosed in the embodiments of this application, steps may be represented directly as being implemented by a hardware decoding processor, or implemented by a combination of hardware and software modules in a decoding processor. A software module may be located in a mature storage medium in the art, such as a RAM, a flash memory, a ROM, a programmable ROM, an electrical erasable programmable memory, a register, or the like. The storage medium is located in the memory 350, and the processor 310 reads information in the memory 350 and completes the steps of the foregoing methods in combination with hardware thereof.

Optionally, the processor 310 is configured to:

clean the audio service quality data, and determine audio service quality data of an effective sample in the audio service quality data; and determine, according to an audio service quality parameter of the effective sampling point and a correspondence between the link quality score and the audio service quality parameter, the link quality score of the current sending link of the first user equipment.

Optionally, the processor 310 is configured to:

determine a decision-making model according to stored historical link information; and determine, according to the link quality score of the current sending link and the decision-making model, the first link or the second link as the subsequent sending link of the first user equipment.

Optionally, the processor 310 is configured to:

when the historical link information includes only information about one type of link, determine the decision-making model as an absolute threshold decision-making model, where the one type of link is the first link or the second link, and a formula of the absolute threshold decision-making model is as follows:

$$Threshold_{abs} = Threshold_{abs0} - X^n$$

where $Threshold_{abs}$ is a current absolute threshold, $Threshold_{abs0}$ is an initial, absolute threshold, X is an attenuation parameter, and n is a total number of times of link handover up to now; and when determining that the link quality score of the current sending link is less than the current absolute threshold $Threshold_{abs}$, make a decision about using another link as the subsequent sending link of the first user equipment, where the another link is the second link or the first link.

Optionally, the processor 310 is configured to:

when the historical link information includes information about two types of links, determine the decision-making model as a relative threshold decision-making model, where a formula of the relative threshold decision-making model is as follows:

$$Threshold_{rel} = Threshold_{rel0} - X^n$$

where $Threshold_{rel}$ is a current relative threshold, $Threshold_{rel0}$ is an initial relative threshold, X is an attenuation parameter, and n is a total number of times of link handover up to now; and when determining that a difference between the link quality score of the current sending link and a quality score of another link is less than the current relative threshold $Threshold_{rel}$, make a decision about using the another link as the subsequent sending link of the first user equipment, where if the current sending link is the first link, the another link is the second link, and if the current sending link is the second link, the another link is the first link.

Optionally, the transceiver 330 is further configured to send a link handover instruction to the first user equipment, where the link handover instruction is used to instruct:

the first user equipment to hand over from the first link to the second link if the current sending link is the first link, and the subsequent sending link is the second link; and the first user equipment to hand over from the second link to the first link if the current sending link is the second link, and the subsequent sending link is the first link.

Optionally, the transceiver 330 is further configured to send the storage address to the media terminal device, so that the media terminal device obtains the requested media resource from the storage address.

Optionally, the processor 310 is further configured to: when the subsequent sending link is the same as the current sending link, and time when the current sending link is used exceeds n decision-making periods, determine, according to the following formula, a time interval to a next request for link decision-making, where n is an integer greater than 1;

$$Period=Period_0+n*\Delta$$

where $Period_0$ is an initial time interval, n is a decision-making period, and $\Delta$ is a link stability coefficient; and the transceiver 330 is further configured to send the time interval Period to the first user equipment.

A person of ordinary skill in the art may understand that all or some of the steps of the methods in the embodiments may be implemented by a program instructing relevant hardware. The program may be stored in a non-transitory computer readable storage medium. The storage medium may include: a ROM, a RAM, a magnetic disk, or an optical disc.

The link decision-making method, and the decision-making computing device and system provided in the embodiments of this application are described in detail above. Principles and implementations of this application are explained herein with reference to specific examples. The embodiments are used only to help understand the method and core thought of this application. Moreover, a person of ordinary skill in the art may make changes in specific implementations and the application scope based on thoughts of this application. In conclusion, the content of this specification should not be understood as a limitation to this application.

What is claimed is:

1. A link decision-making method, the method being applied to a link decision-making system, the link decision-making system comprising a first user equipment and a second user equipment that are in a Voice over Internet Protocol (VoIP) call status, a transit server, and a decision-making computing device, a first link directly connecting the first user equipment to the second user equipment and a second link that transits by using the transit server existing between the first user equipment and the second user equipment, and the method comprising:

receiving, by the decision-making computing device, audio service quality data reported by the first user equipment, wherein the second user equipment determines the audio service quality data according to audio data sent by the first user equipment to the second user equipment and then returns the audio service quality data to the first user equipment;

determining, by the decision-making computing device according to the audio service quality data, a link quality score of a current sending link of the first user equipment, the current sending link being the first link or the second link; and making, by the decision-making computing device according to the link quality score of the current sending link, a decision about using the first link or the second link as a subsequent sending link of the first user equipment, further including:

determining, by the decision-making computing device, a decision-making model as an absolute threshold decision-making model according to stored historical link information that comprises only information about one type of link, wherein the one type of link is one of the first link and the second link, and a formula of the absolute threshold decision-making model is defined as:

$$Threshold_{abs}=Threshold_{abs0}-X^n$$

wherein $Threshold_{abs}$ is a current absolute threshold, $Threshold_{abs0}$ is an initial absolute threshold, X is an attenuation parameter, and n is a total number of times of link handover up to now; and determining, by the decision-making computing device according to a determination that the link quality score of the current sending link is less than the current absolute threshold $Threshold_{abs}$ and the decision-making model, one of the first link and the second link as the subsequent sending link of the first user equipment; and making, by the decision-making computing device, a decision about using another link as the subsequent sending link of the first user equipment, wherein the another link is the other of the first link and the second link.

2. The method according to claim 1, wherein the determining, by the decision-making computing device according to the audio service quality data, a link quality score of a current sending link of the first user equipment comprises:

determining, by the decision-making computing device, audio service quality data of an effective sampling point in the audio service quality data; and determining, by the decision-making computing device according to an audio service quality parameter of the effective sampling point and a correspondence between the link quality score and the audio service quality parameter, the link quality score of the current sending link of the first user equipment.

3. The method according to claim 1, wherein the determining, by the decision-making computing device, a decision-making model according to stored historical link information comprises:

when the historical link information comprises information about two types of links, determining the decision-making model as a relative threshold decision-making model, wherein a formula of the relative threshold decision-making model is as follows:

$$Threshold_{rel}=Threshold_{rel0}-X^n$$

wherein $Threshold_{rel}$ is a current relative threshold, $Threshold_{rel0}$ is an initial relative threshold, X is an attenuation parameter, and n is a total number of times of link handover up to now; and the determining, by the decision-making computing device according to the link quality score of the current sending link and the decision-making model, the first link or the second link as the subsequent sending link of the first user equipment comprises:

when determining that a difference between the link quality score of the current sending link and a quality score of another link is less than the current relative threshold $Threshold_{rel}$, making, by the decision-making computing device, a decision about using the another link as the subsequent sending link of the first user equipment, wherein if the current sending link is the first link, the another link is the second link, and if the current sending link is the second link, the another link is the first link.

4. The method according to claim 1, wherein the method further comprises:

sending, by the decision-making computing device, a link handover instruction to the first user equipment, wherein the link handover instruction is used to instruct:

the first user equipment to hand over from the first link to the second link if the current sending link is the first link, and the subsequent sending link is the second link; and the first user equipment to hand over from the second link to the first link if the current sending link is the second link, and the subsequent sending link is the first link.

5. The method according to claim 4, wherein the method further comprises:

when the subsequent sending link is the same as the current sending link, and a time when the current sending link is used exceeds n decision-making periods, determining, by the decision-making computing device according to the following formula, a time interval to a next request for link decision-making, $$Period = Period_0 + n*\Delta$$

wherein $Period_0$ is an initial time interval, n is an integer greater than 1, and $\Delta$ is a link stability coefficient; and sending, by the decision-making computing device, the time interval Period to the first user equipment.

6. A decision-making computing device having one or more processors and memory storing a plurality of programs, the decision-making computing device being applied to a link decision-making system, the link decision-making system further comprising a first user equipment and a second user equipment that are in a Voice over Internet Protocol (VoIP) call status and a transit server, a first link directly connecting the first user equipment to the second user equipment and a second link that transits by using the transit server existing between the first user equipment and the second user equipment, wherein the plurality of programs, when executed by the one or more processors, cause the decision-making computing device to perform the following operations:

receiving, by the decision-making computing device, audio service quality data reported by the first user equipment, the audio service quality data being determined by the second user equipment according to audio data sent by the first user equipment and being returned to the first user equipment;

determining, by the decision-making computing device according to the audio service quality data, a link quality score of a current sending link of the first user equipment, the current sending link being the first link or the second link; and making, by the decision-making computing device according to the link quality score of the current sending link, a decision about using the first link or the second link as a subsequent sending link of the first user equipment, further including:

determining, by the decision-making computing device, a decision-making model as an absolute threshold decision-making model according to stored historical link information that comprises only information about one type of link, wherein the one type of link is one of the first link and the second link, and a formula of the absolute threshold decision-making model is defined as:

$$Threshold_{abs} = Threshold_{abs0} - X^n$$

wherein $Threshold_{abs}$ is a current absolute threshold, $Threshold_{abs0}$ is an initial absolute threshold, X is an attenuation parameter, and n is a total number of times of link handover up to now; and determining, by the decision-making computing device according to a determination that the link quality score of the current sending link is less than the current absolute threshold $Threshold_{abs}$ and the decision-making model, one of the first link and the second link as the subsequent sending link of the first user equipment; and making, by the decision-making computing device, a decision about using another link as the subsequent sending link of the first user equipment, wherein the another link is the other of the first link and the second link.

7. The decision-making computing device according to claim 6, wherein the determining, by the decision-making computing device according to the audio service quality data, a link quality score of a current sending link of the first user equipment comprises:

determining, by the decision-making computing device, audio service quality data of an effective sampling point in the audio service quality data; and determining, by the decision-making computing device according to an audio service quality parameter of the effective sampling point and a correspondence between the link quality score and the audio service quality parameter, the link quality score of the current sending link of the first user equipment.

8. The decision-making computing device according to claim 7, wherein the determining, by the decision-making computing device, a decision-making model according to stored historical link information comprises:

when the historical link information comprises information about two types of links, determining the decision-making model as a relative threshold decision-making model, wherein a formula of the relative threshold decision-making model is as follows:

$$Threshold_{rel} = Threshold_{rel0} - X^n$$

wherein $Threshold_{rel}$ is a current relative threshold, $Threshold_{rel0}$ is an initial relative threshold, X is an attenuation parameter, and n is a total number of times of link handover up to now; and the determining, by the decision-making computing device according to the link quality score of the current sending link and the decision-making model, the first link or the second link as the subsequent sending link of the first user equipment comprises:

when determining that a difference between the link quality score of the current sending link and a quality score of another link is less than the current relative threshold $Threshold_{rel}$, making, by the decision-making computing device, a decision about using the another link as the subsequent sending link of the first user equipment, wherein if the current sending link is the first link, the another link is the second link, and if the current sending link is the second link, the another link is the first link.

9. The decision-making computing device according to claim 6, wherein the operations further comprise:

sending, by the decision-making computing device, a link handover instruction to the first user equipment, wherein the link handover instruction is used to instruct:
the first user equipment to hand over from the first link to the second link if the current sending link is the first link, and the subsequent sending link is the second link; and
the first user equipment to hand over from the second link to the first link if the current sending link is the second link, and the subsequent sending link is the first link.

10. The decision-making computing device according to claim 9, wherein the operations further comprise:
when the subsequent sending link is the same as the current sending link, and a time when the current sending link is used exceeds n decision-making periods, determining, by the decision-making computing device according to the following formula, a time interval to a next request for link decision-making, $$Period = Period_0 + n*\Delta$$

wherein $Period_0$ is an initial time interval, n is an integer greater than 1, and $\Delta$ is a link stability coefficient; and
sending, by the decision-making computing device, the time interval Period to the first user equipment.

11. A non-transitory computer readable storage medium storing a plurality of programs in connection with a decision-making computing device having one or more processors, the decision-making computing device being applied to a link decision-making system, the link decision-making system further comprising a first user equipment and a second user equipment that are in a Voice over Internet Protocol (VoIP) call status and a transit server, a first link directly connecting the first user equipment to the second user equipment and a second link that transits by using the transit server existing between the first user equipment and the second user equipment, wherein the plurality of programs, when executed by the one or more processors, cause the decision-making computing device to perform the following operations:
receiving, by the decision-making computing device, audio service quality data reported by the first user equipment, the audio service quality data being determined by the second user equipment according to audio data sent by the first user equipment and being returned to the first user equipment;
determining, by the decision-making computing device according to the audio service quality data, a link quality score of a current sending link of the first user equipment, the current sending link being the first link or the second link; and
making, by the decision-making computing device according to the link quality score of the current sending link, a decision about using the first link or the second link as a subsequent sending link of the first user equipment, further including:
determining, by the decision-making computing device, a decision-making model as an absolute threshold decision-making model according to stored historical link information that comprises only information about one type of link, wherein the one type of link is one of the first link and the second link, and a formula of the absolute threshold decision-making model is defined as:

$$Threshold_{abs} = Threshold_{abs0} - X^n$$

wherein $Threshold_{abs}$ is a current absolute threshold, $Threshold_{abs0}$ is an initial absolute threshold, X is an attenuation parameter, and n is a total number of times of link handover up to now; and determining, by the decision-making computing device according to a determination that the link quality score of the current sending link is less than the current absolute threshold $Threshold_{abs}$ and the decision-making model, one of the first link and the second link as the subsequent sending link of the first user equipment; and
making, by the decision-making computing device, a decision about using another link as the subsequent sending link of the first user equipment, wherein the another link is the other of the first link and the second link.

12. The non-transitory computer readable storage medium according to claim 11, wherein the determining, by the decision-making computing device according to the audio service quality data, a link quality score of a current sending link of the first user equipment comprises:
determining, by the decision-making computing device, audio service quality data of an effective sampling point in the audio service quality data; and
determining, by the decision-making computing device according to an audio service quality parameter of the effective sampling point and a correspondence between the link quality score and the audio service quality parameter, the link quality score of the current sending link of the first user equipment.

13. The non-transitory computer readable storage medium according to claim 11, wherein the determining, by the decision-making computing device, a decision-making model according to stored historical link information comprises:
when the subsequent sending link is the same as the current sending link, and a time when the current sending link is used exceeds n decision-making periods, determining, by the decision-making computing device according to the following formula, a time interval to a next request for link decision-making, $$Period = Period_0 + n*\Delta$$

wherein $Period_0$ is an initial time interval, n is an integer greater than 1, and $\Delta$ is a link stability coefficient; and
the determining, by the decision-making computing device according to the link quality score of the current sending link and the decision-making model, the first link or the second link as the subsequent sending link of the first user equipment comprises:
when determining that a difference between the link quality score of the current sending link and a quality score of another link is less than the current relative threshold $Threshold_{rel}$, making, by the decision-making computing device, a decision about using the another link as the subsequent sending link of the first user equipment, wherein if the current sending link is the first link, the another link is the second link, and if the current sending link is the second link, the another link is the first link.

14. The non-transitory computer readable storage medium according to claim 11, wherein the operations further comprise:
sending, by the decision-making computing device, a link handover instruction to the first user equipment, wherein
the link handover instruction is used to instruct:
the first user equipment to hand over from the first link to the second link if the current sending link is the first link, and the subsequent sending link is the second link; and the first user equipment to hand over from the second link to the first link if the current sending link is the second link, and the subsequent sending link is the first link.

\* \* \* \* \*